US005385990A

United States Patent [19]

Abbey et al.

[11] Patent Number: 5,385,990

[45] Date of Patent: Jan. 31, 1995

[54] STRUCTURAL ADHESIVE COMPOSITION HAVING HIGH TEMPERATURE RESISTANCE

[75] Inventors: Kirk J. Abbey, Raleigh; Stephen E. Howe, Apex; Beth C. Munoz, Cary, all of N.C.

[73] Assignee: Lord Corporation, Erie, Pa.

[21] Appl. No.: 970,322

[22] Filed: Nov. 2, 1992

[51] Int. Cl.[6] .............................................. C08F 283/00

[52] U.S. Cl. .................................. 525/534; 525/327.3; 525/529; 525/530; 525/532; 525/533; 525/112; 528/93; 528/96; 528/97; 528/99; 528/113; 528/120

[58] Field of Search ..................... 525/327.3, 529, 530, 525/532, 533, 534, 112; 528/93, 96, 97, 99, 113, 120

[56] References Cited

U.S. PATENT DOCUMENTS

| | | | |
|---|---|---|---|
| 3,819,564 | 6/1974 | Gindrup et al. | 525/529 |
| 3,954,490 | 4/1976 | Cockram | 524/5 |
| 4,105,627 | 8/1978 | Sekiguchi et al. | 524/83 |
| 4,129,670 | 12/1978 | Riew | 427/386 |
| 4,320,222 | 3/1982 | Lopez | 525/524 |
| 4,330,644 | 4/1982 | Allen | 525/523 |
| 4,358,578 | 11/1982 | Browncombe | 528/104 |
| 4,552,814 | 11/1985 | Cavitt et al. | 525/528 |
| 4,578,424 | 3/1986 | Goel | 528/109 |
| 4,695,605 | 9/1987 | Goel | 525/109 |
| 4,739,091 | 4/1988 | Schappert et al. | 525/438 |
| 4,740,394 | 4/1988 | Goel | 523/400 |
| 4,774,080 | 9/1988 | Yamamori et al. | 523/122 |
| 4,803,232 | 2/1989 | Shah | 523/456 |
| 4,822,683 | 4/1989 | Schappert et al. | 428/414 |
| 4,921,912 | 5/1990 | Sagawa et al. | 525/112 |
| 5,021,471 | 6/1991 | Treybig | 525/504 |

OTHER PUBLICATIONS

"The Handbook of Epoxy Resins" by Lee & Neville, 1982 Reissue, pp. 5–9 to 5–13, 9–9 to 9–13, 16–16 to 16–20.

*Primary Examiner*—Melvyn I. Marquis
*Assistant Examiner*—Randy Gulakowski

[57] ABSTRACT

A structural adhesive composition containing an epoxy compound, an amine hardener and a hydroxy-substituted aromatic compound having a pKa ranging from about 5 to 9.7 and a boiling point greater than about 210° C. The utilization of a hydroxy-substituted aromatic compound having a pKa and a boiling point within the stated ranges provides for an adhesive composition which develops significant green strength, undergoes minimal sinkage during the bonding and curing process, and is capable of withstanding high temperature conditions.

27 Claims, No Drawings

STRUCTURAL ADHESIVE COMPOSITION HAVING HIGH TEMPERATURE RESISTANCE

FIELD OF THE INVENTION

The present invention relates to an epoxy adhesive composition useful for bonding various materials such as plastics or thermoplastics. More specifically, the invention relates to a high temperature-resistant, epoxy adhesive composition that utilizes a hydroxy-substituted aromatic compound having a pKa ranging from about 5 to 9.7 and a boiling point greater than about 210° C.

BACKGROUND OF THE INVENTION

The utilization of plastic and thermoplastic substrates in various industries typically requires the use of curable adhesive compositions to affix or bond the substrate to another structural component. The bond formed between the plastic or thermoplastic substrate and the structural component must meet certain requirements of adhesive strength depending on the particular application. One example of an industrial utilization of plastic substrates involves the use of rigid fiber-reinforced plastic composite materials in the form of sheet molding compound (SMC). The automobile industry utilizes SMC as an alternative to steel automotive body panels in an effort to reduce weight and corrosion susceptibility of an automobile, van, truck or the like. Sheet molding compound is typically comprised of various resin compositions such as a polyester resin reinforced with, for example, glass fibers. The sheet molding compound is molded under heat and pressure in order to prepare a rigid, self-supporting, fiber-reinforced structure. After being bonded for use in automobile applications, the bonded SMC is often exposed during paint bake cycles to temperatures up to 205° C. for periods of time up to one hour.

Various structural adhesive compositions based on epoxy compounds which have previously been described as being useful for bonding sheet molding compounds and other substrates are disclosed in, for example, U.S. Pat. Nos. 4,578,424; 4,695,605; 4,740,539; 4,803,232; and 4,921,912. Many traditional epoxy-based structural adhesive compositions such as those disclosed in the above patents suffer from the disadvantage of undergoing foaming or disintegration during the high temperature paint baking process. This foaming or disintegration of the adhesive composition can cause cohesive failure of the adhesive or interfacial failure between the parts being bonded, rendering them undesirable for industrial applications.

Another disadvantage suffered by many epoxy-based structural adhesive compositions is the tendency to undergo adhesive sinkage during the bonding and curing process. Adhesive sinkage involves tensile strains imparted to the adhesive by plastic or thermoplastic substrates, for example, when the substrates pull away from one another during the process of cooling. If the adhesive has not developed ample modulus or green strength, these tensile stresses can cause recessions in the bond line or other imperfections in the bonded assembly. A slight bond line recession or imperfection can interfere with the cosmetics of the bonded part so as to require sanding, refilling, and repainting of the bond line. This is a particular problem in the bonding of exterior automobile parts where the bond line may be readily visible.

It is important for structural adhesive compositions to have the ability to rapidly develop significant green strength. Green strength, also commonly referred to as handling strength, relates to the ability of the adhesive composition to develop an initial tackiness or adhesion upon application of the adhesive such that parts being bonded with the adhesive will remain securely together although the adhesive has not fully cured. This is particularly important in the automobile industry where parts are initially placed together in a bonding press but are shortly thereafter hung in a curing oven or the like where it is essential that the parts remain securely attached to one another during the final curing process.

A need exists for a structural adhesive composition which can withstand high temperature paint bake conditions and which minimizes bond sinkage so as to avoid costly and time-consuming repair or rebonding. Such an adhesive composition should also exhibit a reasonable cure rate and be capable of developing a significant green strength.

SUMMARY OF THE INVENTION

The present invention is an epoxy adhesive composition which can withstand high temperature conditions and which minimizes bond sinkage. The adhesive composition develops significant green strength and is capable of being cured in a relatively short period of time. The adhesive composition comprises an epoxy compound, an amine hardener and a hydroxy-substituted aromatic compound having a pKa ranging from about 5 to 9.7 and a boiling point greater than about 210° C. It has been discovered that the utilization a hydroxy-substituted aromatic compound having a pKa and a boiling point within certain respective ranges results in a surprising increase in both green strength and high temperature resistance and a corresponding decrease in sinkage of an epoxy adhesive composition during the bonding and curing process without sacrificing cure speed.

DETAILED DESCRIPTION OF THE INVENTION

The present epoxy adhesive composition comprises an epoxy compound, an amine hardener and a hydroxy-substituted aromatic compound.

The epoxy compound of the present invention can be any compound that contains an epoxy group having the formula:

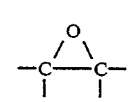

and has a viscosity of about 200 centipoise or higher at 25° C. Such materials, broadly called epoxides, include monomeric epoxy compounds and epoxides of the polymeric type and can be aliphatic, cycloaliphatic, aromatic or heterocyclic. These materials generally have, on the average, at least 1.5 polymerizable epoxy groups per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

The epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention may be cycloaliphatic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Further epoxy-containing materials which are particularly useful in the practice of this invention include glycidyl ether monomers of the formula:

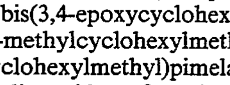

where R' is alkyl or aryl and n is an integer of 1 to 6. Examples are glycidyl ethers of polyhydric phenols obtained by reacting a polyhydric phenol with an excess of chlorohydrin such as epichlorohydfin [e.g., the diglycidyl ether of 2,2-bis(4-hydroxyphenyl)-propane]. Further examples of epoxides of this type which can be used in the practice of this invention are described in U.S. Pat. No. 3,018,262, and in "Handbook of Epoxy Resins" by Lee and Neville, McGraw-Hill Book Co., New York, 1967, both the disclosures of which are incorporated herein by reference.

There are a host of commercially available epoxy-containing materials, commonly known as epoxy resins, which can be used as the epoxy compound in this invention. In particular, epoxy compounds which are readily available include octadecylene oxide, glycidylmethacrylate, diglycidyl ether of bisphenol A (e.g., those available under the trade designations EPON 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexylmethyl-3,4-epoxy-6-methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.).

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylateglycidylmethacrylate.

The epoxy compound of the present invention is typically utilized in an amount ranging from about 30 to 80, preferably from about 40 to 60, percent by weight of the essential ingredients of the adhesive composition. Essential ingredients of the adhesive composition herein refers to the epoxy compound, the amine hardener and the hydroxy-substituted compound.

The amine hardener utilized in the present invention may be any substance generally known as an amine-type curing agent for epoxy resins. For example, aliphatic polyamines, polyamidoamines, alicyclic polyamines, tertiary amines and various mixtures thereof are used for this purpose. Examples of amine hardeners for purposes of the present invention include diethylenetriamine, triethylenetetramine, tetraethylenepentamine, 2-methyl-1,5-pentanediamine, diethanolamine, methyldiethanolamine, triethanolamine, pentaethylenehexamine, ethylenediamine, tetramethylenediamine, hexamethylenediamine, polyetherdiamine, bis-hexamethylenetriamine, diethylaminopropylamine, trimethylhexa-methylenediamine, oleylamine, dipropylenetriamine, 1,3,6-tris-aminomethylhexane, 3,9-bis(3-aminopropyl)-2,4,8,10-tetraoxaspiro[5,5]-undecane, 1,3-bis-aminomethylcyclohexane, bis(4-aminocyclohexyl)-methane, bis(4-amino-3-methylcyclohexyl)methane, isophoronediamine, N-aminoethylpiperazine, and the like. Aliphatic polyamines which are modified by adduction with epoxy resins or acrylonitrile, or by condensation with fatty acids can also be utilized as amine hardeners. In addition, various Mannich bases can be employed as amine hardeners for purposes of the present invention.

Aromatic polyamines wherein the amine groups are directly attached to the aromatic ring, such as xylene diamine and the like, can also be used in the practice of the invention but are less preferred to their aliphatic counterparts. Examples of aromatic polyamines include diaminophenylmethane, aniline-formaldehyde low molecular weight condensate, m-phenylenediamine, diaminodiphenyl-sulfone, and the like.

The polyamidoamines that may be utilized as the present amine hardener are typically the reaction products of aliphatic amines with dimerized fatty acids of 12 to 28 carbon atoms. These polyamidoamines are well known and commercially available. A typical example is VERSAMID 140 (Henkel, USA) which is a polyamidoamine of dimerized linoleic acid. Mixtures of amine hardeners may also be utilized in the invention.

It is particularly preferred to utilize an unhindered aliphatic amine hardener for purposes of the present invention since it has presently been found that unhindered aliphatic amine hardeners are particularly effective at assisting in the development of green strength. Unhindered aliphatic amine hardener herein refers to an amine compound containing a primary amine group attached to a primary carbon atom. Examples of unhindered aliphatic amine hardeners include diethylenetriamine, triethylenetetramine, tetraethylenepentamine, 2-methyl-1,5-pentanediamine, pentaethylenehexamine, ethylenediamine, tetramethylenediamine, hexamethylenediamine, bis-hexamethylenetriamine, 3,9-bis(3-aminopropyl)-2,4,8,10-tetraoxaspiro[5,5]-undecane, and 1,3-bis-aminomethylcyclohexane, with diethylenetriamine, triethylenetetramine, tetraethylenepentamine, 2-methyl-1,5-pentanediamine and 1,3-bis-aminomethylcyclohexane being preferred.

The amine hardener is typically utilized in an amount ranging from about 10 to 50, preferably from about 20 to 40, percent by weight of the essential ingredients of the adhesive composition.

The hydroxy-substituted aromatic compound of the present invention can essentially be any aromatic compound having at least one hydroxy substituent and, optionally, at least one electron-withdrawing substituent attached to the aromatic compound such that the aromatic compound has a pKa in the range from about 5 to 9.7, preferably from about 6 to 9.6, and most preferably from about 7 to 9.5. All pKa values referred to and cited herein are as determined in water at 25° C. The hydroxy-substituted aromatic compound must also have a boiling point greater than about 210° C., preferably greater than about 215° C.

The hydroxy-substituted aromatic compound of the present invention typically corresponds to the following formula:

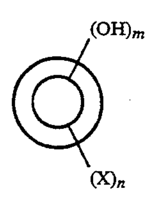

wherein ⊙ is a 5- or 6-membered, heterocyclic or nonheterocyclic, monocylicic or multicylcic aromatic ring; X is an electron-withdrawing group; m is 1, 2, or 3; and n is 0, 1, 2, or 3 with the proviso that (1) n cannot be zero when the aromatic ting is benzene and (2) the locations of OH and X on the aromatic ring are such that the overall compound has a pKa within the range from about 5 to 9.7. Examples of ⊙ include

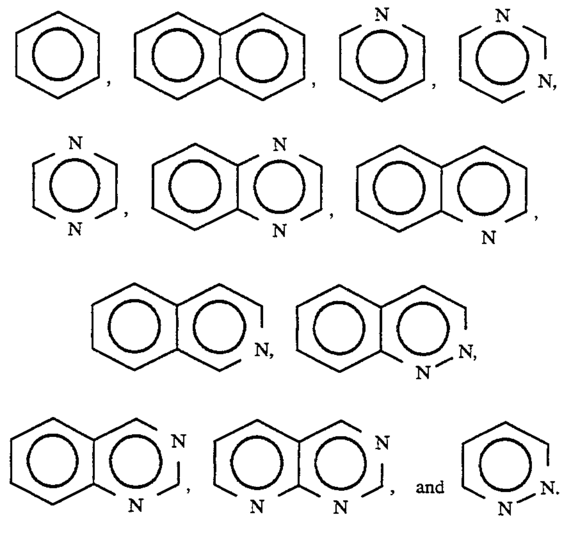

The substituent X can be any electron-withdrawing group that causes the aromatic compound to have a pKa within the range from about 5 to 9.7, preferably from about 6 to 9.6 and most preferably from about 7 to 9.5. The pKa's of hydroxy-substituted aromatic compounds are well known and the selection of appropriate substituents and their location on a given aromatic compound for purposes of obtaining the desired pKa's of the present invention will be readily apparent to one of ordinary skill in the art. The pKa's of hydroxy-substituted aromatic compounds can be found in, for example, Serjeant et al., "Ionization Constants of Organic Acids in Aqueous Solution," Permagon Press: New York, 1979; in Katritzky, "Physical Methods in Heterocyclic Chemistry," Academic Press: New York, 1963; and in Ritchie, "Physical Organic Chemistry: The Fundamental Concept," Marcel Dekker Inc.: New York, 1990; all the disclosures of which are incorporated herein by reference.

Specific examples of electron-withdrawing groups that can be utilized as the X substituent in the present invention include —Cl, —$NO_2$, —$CF_3$, —$CO_2R$, —$CH_2OR$, —CN, and —$SO_2R$, where R is an alkyl radical having from 1 to 5 carbon atoms or aryl and R is preferably methyl, ethyl, propyl or phenyl.

Examples of hydroxy-substituted aromatic compounds useful in the present invention include p-chlorophenol; m-chlorophenol; 3-chloro-4-fluorophenol; 3,4-dichlorophenol; 3,4-difiuorophenol; 4-hydroxy benzoic acid esters of ethanol, 1-propanol, 2-propanol, 2-methyl-2-propanol, 2,5-hexanediol, and 2,5-dimethyl-2,5-hexanediol; 3-hydroxy-phenylmethylsulfone; 4-hydroxyphenyl-2-propylsulfone; 4-fluoro-1-hydroxynaphthalene; 4-chloro-1-hydroxynaphthalene; 2-nitro-1-hydroxy-naphthalene; 1,3-dihydroxynaphthalene; 1,5-dihydroxynaphthalene; 1,6-dihydroxynaphthalene; 1,7-dihydroxynaphthalene; 2,6-dihydroxynaphthalene; 2,7-dihydroxynaphthalene; 3-hydroxypyridine; 2-hydroxypyridine; 2-chloro-3-hydroxypyridine; 2,3-dihydroxypyridine; 2,4-dihydroxypyridine; 2,5-dihydroxypyridine; 3-hydroxy-2-hydroxymethylpyridine; 3-hydroxy-4-hydroxymethylpyridine; 3-hydroxyquinoline; 4-hydroxyquinoline; 5-hydroxyquinoline; 6-hydroxyquinoline; 7-hydroxyquinoline; 8-hydroxyquinoline; 8-hydroxy-7-chloroquinoline; 2-methyl-8-hydroxyquinoline; 4-hydroxypyridazine; 3,6-dihydroxypyridazine; 5-, 2- and 4-hydroxypyrimidine; 2,4-dihydroxypyrimidine; 2,4-dihydroxy-6-methylpyrimidine; 4,6-dihydroxypyrimidine; 4,6-dihydroxy-5-nitropyrimidine; 4-hydroxy-5-methoxypyrimidine; 4-hydroxy-6-chloropyrimidine; 4-hydroxy-6-diethoxymethylpyrimidine; 2-hydroxy-5-nitropyrimidine; 2-hydroxypyrazine; 3-, 4-, 5-, 6-, 7- and 8-hydroxycinnoline; 8-hydroxy-4-methylcinnoline; 4-, 5-, 6-, 7- and 8-hydroxyquinazoline; 8-hydroxy-4-methylquinazoline; 2-hydroxyquinoxaline; 7-hydroxypteridine; 2,4-dihydroxypteridine; 4-hydroxy-2methylpteridine; 4-hydroxy-6-methylpteridine; and 4-hydroxy-7-methylpteridine.

Preferred classes of hydroxy-substituted aromatic compounds include halogenated phenolic compounds, hydroxy benzoic acid esters, hydroxy-substituted naphthalenes, hydroxy-substituted pyridines, hydroxy-substituted pyrimidines, and hydroxy-substituted quinolines.

The halogenated phenolic compounds can be represented by the above structure wherein the aromatic ring is benzene; m is 1; n is 1 or 2; and X is fluorine, chlorine or bromine, with chlorine and fluorine being preferred. Examples of preferred halogenated phenolic compounds include p-chlorophenol, 3-chloro-4-fluorophenol, 3,4-dichlorophenol, and 3,4-difiuorophenol with p-chlorophenol being most preferred.

The hydroxy benzoic acid esters can be represented by the above structure wherein the aromatic ring is benzene; m is 1; n is 1 or 2; and X is —$CO_2R$, wherein R is as defined above. Examples of preferred hydroxy benzoic acid esters include the 4-hydroxy benzoic acid esters of ethanol and 1-propanol.

The hydroxy-substituted naphthalene compounds can be represented by the above structure wherein the aromatic ring is naphthalene; n is 0 or 1; m is 1 or 2; and, if present, X is —Cl or —$NO_2$. Examples of preferred hydroxy-substituted naphthalene compounds include 1,5-dihydroxynaphthalene; 1,7-dihydroxynaphthalene; 2,7-dihydroxynaphthalene; 4-chloro-1-hydroxy-naphthalene; and 2-nitro-1-hydroxynaphthalene.

The hydroxy-substituted pyridine compounds can be represented by the above structure wherein the aromatic ring is pyridine, n is 0 and m is 1 or 2. Examples of preferred hydroxy-substituted pyridine compounds include 2-hydroxypyridine; 3-hydroxypyridine; and 2,3-dihydroxypyridine.

The hydroxy-substituted pyrimidine compounds can be represented by the above structure wherein the aromatic ring is pyrimidine; n is 0 or 1; m is 1 or 2; and, if present, X is —Cl or —$NO_2$. Examples of preferred hydroxy-substituted pyrimidine compounds include 4-hydroxypyrimidine; 5-hydroxypyrimidine; 2,4-dihyroxy-6-methylpyrimidine; 4,6-dihydroxyopyrimidine; and 4,6-dihydroxy-5-nitropyrimidine.

The hydroxy-substituted quinoline compounds can be represented by the above structure wherein the aromatic ring is quinoline; n is 0 or 1; m is 1 or 2; and, if present, X is —Cl or —$NO_2$. Examples of preferred hydroxy-substituted quinoline compounds include 3-hydroxyquinoline; 5-hydroxyquinoline; 7-hydroxyquinoline; and 2-methyl-8-hydroxyquinoline.

The halogenated phenolic compounds are presently the most preferred hydroxy-substituted aromatic compounds.

The hydroxy-substituted aromatic compound is typically utilized in an amount ranging from about 2 to 20, preferably from about 5 to 15, percent by weight of the essential ingredients of the adhesive composition. The hydroxy-substituted aromatic compounds of the present invention may be prepared by methods well known to those skilled in the art and many of the hydroxy-substituted aromatic compounds are commercially available.

A rubber component can also be utilized in the present invention in order to provide toughness and flexibility to the overall adhesive. The rubber component can be present as a dispersion of precrosslinked rubber in the epoxy compound as is known in the art. Examples of precrosslinked rubber compounds available as dispersions in epoxy resins include polyacrylates, polybutadienes, polyisoprenes and the like. The rubber component can also be a liquid rubber precursor such as acrylate-terminated butadienes and amine-, acrylate-, and epoxy-terminated butadienes-acrylonitrile copolymer rubbers.

As more fully described hereinafter, the present adhesive composition can be applied as a two-part system comprising an epoxy component and an amine component. If utilized in such a two-part system, the liquid rubber precursor should be selected to be consistent with the two-part system. For example, amine-terminated rubbers should be included in the amine component and acrylate- or epoxy-terminated rubbers should be included in the epoxy component.

The amine-terminated butadiene-acrylonitrile copolymer rubbers are particularly preferred for use in the invention and are liquid elastomers that normally have an acrylonitfile content of about 5 to 40, preferably about 10 to 26, percent by weight and a butadiene content of about 95 to 60, preferably about 90 to 74, percent by weight, based on the liquid butadiene-acrylonitrile copolymer. Generally, the amine-terminated butadiene-acrylonitrile copolymers contain an average from about 1.7 to 3 primary and/or secondary amine groups per molecule, preferably about 1.7 to 2.3 primary or secondary amine groups per molecule and may have Brookfield viscosities measured at 27° C. of about 500 cps to 2,500,000 cps, preferably about 500 cps to 500,000 cps. The amine-terminated butadiene-acrylonitrile copolymers of the invention are well known articles of commerce and can be prepared by reacting a carboxyl-terminated or ester-terminated butadiene-acrylonitrile copolymer with at least one aliphatic, alicyclic or heterocyclic amine containing at least two primary and/or secondary amine groups. The amine-terminated liquid copolymers may also be prepared by reacting an acid chloride-terminated butadiene-acrylonitrile with at least one of the aforementioned amines. Methods for preparing amine-terminated butadiene-acrylonitrile copolymers are described in more detail in, for instance, U.S. Pat. No. 4,129,670, which is incorporated herein by reference. Commercially available amine-terminated butadiene-acrylonitrile copolymer rubbers can be obtained under various tradenames including HYCAR ATBN (B. F. Goodrich Co.), H-3932 (ACR Co.), and X-3995 (ACR Co.).

The rubber component, if utilized, is typically employed in an amount ranging from about 5 to 35, preferably from about 10 to 20, percent by weight of the total ingredients of the adhesive composition.

The present adhesive composition is preferably utilized as a two-part adhesive composition due to the relatively high reactivity between the epoxy compound and the amine hardener. If employed as a two-part adhesive composition, the first part comprises the epoxy compound while the second part comprises the amine hardener and the hydroxy-substituted aromatic compound.

When it is desired to enhance the non-sag characteristics of the adhesive compositions of the invention, the compositions may optionally include a mixture of a polyol and activated silica such as fumed silica or colloidal silica. The activated silica is believed to combine with the polyol via hydrogen-bonding to provide the thixotropic properties necessary to enhance non-sag characteristics of the adhesive composition.

The polyol for use in combination with the activated silica can be essentially any poly(alkylene oxide) polyol known in the art having at least two hydroxyl groups. The polyols are normally obtained from the polymerization, including block copolymerization, of cyclic ethers such as alkylene oxides, dioxolane and tetrahydrofuran, the condensation of glycols, or the condensation of cyclic ethers with glycols. The poly(alkylene oxide) polyols are well-known articles of commerce, and are also called polyalkylene ether glycols, polyalkylene glycols, polyalkylene oxide glycols, polyglycols and polyoxyalkylene glycols. The poly(alkylene oxide) polyols may be represented by the formula $HO(RO)_nH$, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6, carbon atoms in the alkylene chain separating each pair of oxygen atoms and have a number average molecular weight in the range of from about 100 to 4,000, preferably about 100 to 2,500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula $HO(CH_2OCH_2CH_2O)_nH$, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide.

Representative poly(alkylene oxide) polyols for use in the present invention include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Thus, the poly(alkylene oxide) polyols will generally have from 2 to 6 hydroxyl groups, with such polyols having 2 hydroxyl groups being currently preferred. Particularly preferred are poly(ethylene oxide) polyols such as poly(ethylene oxide) diol, commonly known as diethylene glycol.

When employed in a two-part adhesive composition, the mixture of activated silica and polyol are generally included in the first part of the adhesive composition. The polyol and the activated silica are typically utilized in respective amounts ranging from about 1 to 8, preferably from about 2 to 5, percent by weight of the total ingredients of the adhesive composition.

The non-sag characteristics of the present adhesive compositions can be enhanced by other methods including the reaction of a small amount of polyisocyanate with the amine hardener as is disclosed in U.S. Pat. No. 4,695,605, the disclosure of which is incorporated herein by reference.

The adhesive compositions of the invention can also contain conventional additives normally found in epoxy adhesives, such as talc, metal powders, titanium dioxide, wetting agents, and the like. Such additives are incorporated in current ratios well known to practitioners in the art of epoxy adhesives.

In the preferred two-part system of the present invention, the two parts of the adhesive composition are metered and mixed together immediately before use in a weight ratio of first part:second part ranging from about 0.5:1 to 10:1, preferably from about 0.8:1 to 3:1. After mixing, the adhesive is sufficiently viscous to form a discrete bead when extruded onto a surface and has an open time of at least 10 minutes at ambient temperature. A bead of adhesive is applied to at least one of the surfaces which are to be bonded, the parts are mated together and the assembly is heated at a temperature in the range from about 70° C. to 190° C. for about 1 minute to 1 hour, preferably from about 5 to 40 minutes. While the adhesives can be applied by any conventional method such as by roll coater, brush, curtain coater, extrusion or hand roller, robotic dispensing machines are preferred.

Although capable of bonding any substrate or surface capable of receiving an adhesive, the adhesives of this invention are especially suited to bonding fiber reinforced unsaturated resin sheet molding compound (SMC) parts to other SMC parts or metals. When utilized to bond SMC parts for use in the automobile industry, the adhesive is applied between the parts to be bonded and the parts are mated together and subjected to a bonding cycle ranging from about 1 to 10 minutes at temperatures ranging from about 90° C. to 150° C. during which the adhesive composition is allowed to develop green strength. The curing process is then completed by subjecting the mated parts to temperatures ranging from about 135° C. to 160° C. for a period of time ranging from about 20 to 40 minutes. After cure is completed, the bonded parts are frequently subjected to a paint bake cycle at temperatures up to 205° C. for as long as one hour.

The adhesive compositions of the invention have the unusual ability to very quickly develop significant green strength. In addition, the adhesive compositions of the invention are capable of withstanding temperatures up to 205° C. for up to one hour such as experienced during typical paint bake cycles utilized in the automobile industry for bonding SMC parts.

The following examples are provided for purposes of specifically illustrating the invention and are not intended to limit in any manner the scope of the present invention.

EXAMPLE 1

A first part and a second part of a two-part epoxy adhesive composition are prepared utilizing the gram amounts of the ingredients shown below:

| Ingredient | Amt. (g) |
|---|---|
| First Part | |
| Diglycidyl) Ether of bis-phenol A[(a)] | 60.2 |
| Talc | 39.8 |
| | 100.00 |
| Second Part | |

-continued

| Ingredient | Amt. (g) |
|---|---|
| Diethylenetriamine | 4.29 |
| Polyamidoamine[b] | 19.36 |
| p-Chlorophenol | 9.54 |
| Amine-terminated acrylonitrile butadiene copolymer rubber | 34.13 |
| Talc | 32.68 |
| | 100.00 |

[a]EPON 828 - Shell Chemical Company
[b]VERSAMID 140 - Henkel, U.S.A.
[c]HYCAR ATBN 1300 × 16 - B.F. Goodrich Co.

Lap Shear Test

The first and second parts are metered and mixed together in a first part:second part volume ratio of 1:1.25. The adhesives so prepared are then utilized to bond two groups of five sets of 1" by 4" SMC parts (GENCORP 7113—GenCorp Automotive). The surfaces of the SMC parts are wiped with a dry rag before application of the adhesive. The adhesive film thickness applied is 30 mils and the bond area is 1" by 1". The bonded assemblies are cured at 145° C. for 30 minutes, allowed to cool to room temperature, and then subjected to a 204° C. post-bake for one hour to simulate paint bake conditions. The two groups are then tested for lap shear strength according to SAE TEST J1525, at a crosshead speed of 0.5" per minute. One group of the samples is subjected to the lap shear test at room temperature (RT), the other at 180° F. The results of the tests are shown below in Table 1 and the values represent an average of the five sets. The breaking strength (in psi) is also given in Table 1 and describes the amount of force required to separate the SMC parts.

Wedge Plaque Test

The adhesive of Example 1 is also used to bond two groups of five sets of 2"×4" SMC parts (GENCORP 7113—GenCorp Automotive). The surfaces of the SMC parts are wiped with a dry rag prior to application of the adhesive. The adhesive bond area is 2"×2" and is situated to cover one half of the 2"×4" bonded assemblies, commonly referred to as wedge plaques. The adhesive film thickness is maintained at 30 mils by the use of a small amount of 30 mil glass beads. Both sets of samples are subjected to a 30 minute cure at 145° C., cooled to ambient temperature and then subjected to a post-bake at 200° C. for one hour to simulate paint bake conditions. One set of samples is pried open with a screwdriver at room temperature, the other is heated to 180° F. and opened hot. The results of the test are shown below in Table 1 and the values represent an average of the five sets. The wedge plaque test does not provide for the measurement of breaking strength.

EXAMPLE 2

An adhesive composition is prepared in accordance with Example 1 except that the 4-hydroxy benzoic acid ester of 1-propanol is utilized in place of p-chlorophenol. Two groups of wedge plaque samples are prepared, cured, post-baked, and tested as described in Example 1. The results are shown below in Table 1.

COMPARATIVE EXAMPLE 3

A commercially available two-part epoxy adhesive composition (FUSOR 320/322—Lord Corporation) is utilized to bond additional SMC parts. The commercially available adhesive composition is substantially similar to the adhesive of Example 1 but contains phenol (pKa=9.9, b.p.=182° C.) in the second part instead of p-chlorophenol (pKa=9.41, b.p.=220° C.). Two groups of lap shear and two groups of wedge plaque samples are prepared, cured, post-baked, and tested as described in Example 1. The results are shown below in Table 1.

COMPARATIVE EXAMPLE 4

A commercially available two-part epoxy adhesive composition (FUSOR 320FC/322FC—Lord Corporation) is utilized to bond additional SMC parts. The commercially available adhesive composition is substantially similar to the adhesive of Example 3 but contains an acrylate cure accelerator in the first part. Two groups of lap shear and two groups of wedge plaque samples are prepared, cured, post-baked, and tested as described in Example 1. The results are shown below in Table 1.

The modes of failure set forth in Table 1 below are described as percent fiber tear (FT), percent thin layer substrate failure (TLS), percent cohesive failure (COH) or percent interfacial failure (IF). Fiber tear indicates that the failure occurred in the substrate so as to tear the reinforcing fibers of the SMC, while thin layer substrate failure indicates that the failure occurred within the outer layer of the SMC substrate. Cohesive failure indicates that the failure occurred within the adhesive layer, while interfacial failure indicates that the adhesive did not adhere to the substrate and that failure occurred between the adhesive layer and the substrate. A high percent of fiber tear and/or thin layer substrate failure is desired since this indicates that the adhesive bond is stronger than the substrate itself.

TABLE 1

| | Lap Shear | | Wedge Plaque | |
|---|---|---|---|---|
| Example | RT | 180° F. | RT | 180° F. |
| 1 | 100 FT (551 psi) | 99 FT, 1 TLS (550 psi) | 85 FT, 15 TLS | 85 FT, 15 TLS |
| 2 | not tested | not tested | 94 FT, 6 TLS | 85 FT, 3 COH, 12 IF |
| 3 | 100 FT (500 psi) | 70 COH, 30 IF (196 psi) | 85 FT, 15 COH | 60 FT, 40 COH |
| 4 | 100 FT (490 psi) | 100 COH (147 psi) | 100 COH | 40 FT, 60 COH |

It should be noted that a close examination of the tested parts revealed a foamy disintegration in the cohesive failures of the adhesives of Examples 3 and 4. However, the adhesives of Examples 1 and 2 showed no signs of a foamy disintegration.

As can be seen from the data in Table 1, the adhesive composition of the present invention provides for superior bonding performance, especially at elevated temperatures, as compared to traditional epoxy-based structural adhesive compositions.

Sink Measurements

The adhesive compositions of Example 1 and Comparative Example 3 are utilized to bond two 4" by 4" by 0.1" SMC (PHASE ALPHA—PPG Industries) panels. The adhesive bond thickness is maintained at approximately 0.76 mm using spherical solid glass beads. Next, the adhesive squeeze-out is sanded smooth along the assembly's edge to form a smooth SMC/adhesive/SMC surface. The next step involves establishing the smoothness (flatness) of the sanded SMC/adhesive/SMC surface. This measurement is accomplished using a surface profilometer consisting of a very fine tipped probe (0.10 in diameter) attached to a measuring gauge. Several measurements are made across the finished surface. The sanded assemblies undergo various heat exposures and are then remeasured again using the surface profilometer and the same procedure. Adhesive sink as a result of the heat exposure is then determined. Table 2 shows the results of the sink measurements for Example 1 and Comparative Example 3.

TABLE 2

| | Adhesive Sink (0.01") | | |
|---|---|---|---|
| | 30' @ 300° F. | 30' @ 350° F. | 30' @ 400° F. |
| Example 1 | 0.36 | 0.65 | 1.06 |
| Example 3 | 2.5 | 2.75 | 2.9 |

The data in Table 2 indicates that the adhesive compositions of the present invention undergo substantially less adhesive sink as compared to traditional structural adhesive compositions.

Green Strength Tests

The adhesive compositions of Examples 1 and 2 and Comparative Example 3 are also evaluated for rate of green strength development using single lap joints constructed as described in Example 1 for the lap shear tests using 1"×4" SMC parts (GENCORP 7113—GenCorp Automotive). The surfaces of the SMC parts are wiped with a dry rag prior to application of the adhesive. The joints are assembled one at a time and cured for various lengths of time varying between 60 seconds and 2 minutes in a heated press. Press temperatures varied from 115° C. to 138° C. Immediately upon removal from the press, the parts are tested for breaking strength. Five sets of samples are evaluated for each adhesive at each condition of press temperature and time in press. The average values for the breaking strength of each adhesive are given in Table 3 below. The rate of development of green strength, as displayed by the measured breaking strength at any given time and temperature, is shown to be significantly greater for the adhesive described in Examples 1 and 2 as compared to the adhesive described in Comparative Example 3.

TABLE 3

| | | Breaking Strength (psi) | | |
|---|---|---|---|---|
| Temp (°C.) | Time (sec.) | Ex. 1 | Ex. 2 | Ex. 3 |
| 115 | 60 | 0 | 53 | 0 |
| 115 | 75 | 43 | 64 | 22 |
| 115 | 90 | 86 | 67 | 40 |
| 125 | 60 | 18 | 61 | 12 |
| 125 | 75 | 110 | 66 | 54. |
| 125 | 90 | 150 | 89 | 49 |
| 138 | 60 | 105 | 56 | 20 |
| 138 | 75 | 112 | 73 | 48 |
| 138 | 90 | 133 | 55 | 65 |

As can be seen from the above data, the adhesive compositions of the present invention are capable of forming a robust, high temperature-resistant adhesive bond with SMC substrates while minimizing adhesive sink and maximizing green strength.

What is claimed is:

1. An adhesive composition comprising an epoxy component;

an amine hardener, selected from the group consisting of polyamidoamines, aliphatic polyamines, alicyclic polyamines, tertiary amines and mixtures thereof; and a hydroxy-substituted aromatic compound having a pKa ranging from about 5 to 9.7 and a boiling point greater than about 210° C., wherein the hydroxy-substituted aromatic compound corresponds to the following formula:

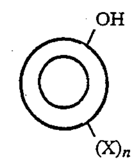

wherein ⊙ is a 5- or 6-membered, heterocyclic or nonheterocyclic, monocyclic or multicyclic aromatic ring; X is an electron-withdrawing group; and n is 0, 1, 2 or 3 with the proviso that (1) n cannot be zero when the aromatic ring is benzene and (2) the locations of OH and X on the aromatic ring are such that the overall compound has a pKa within the range from about 5 to 9.7.

2. A composition according to claim 1 wherein the epoxy compound is an aliphatic, cycloaliphatic, aromatic, or heterocyclic epoxide, and wherein the epoxide can be of the monomeric or polymeric type.

3. A composition according to claim 2 wherein the epoxy compound is a cycloaliphatic epoxide selected from the group consisting of diepoxides of cycloaliphatic esters of dicarboxylic acids and 3,4-epoxycyclohexylmethyl-3,4-epoxycyclohexane carboxylates.

4. A composition according to claim 3 wherein the cycloaliphatic epoxide is 3,4-epoxycyclohexylmethyl-3,4-epoxycyclohexane carboxylate; bis(3,4-epoxycyclohexylmethyl)adipate; or mixtures thereof 5. A composition according to claim 1 wherein the epoxy compound is a glycidyl ether of a polyhydric phenol.

6. A composition according to claim 1 wherein the epoxy compound is a copolymer of an acrylic acid ester of glycidol with one or more copolymerizable vinyl compounds.

7. An adhesive composition according to claim 1 wherein the amine hardener is an unhindered aliphatic amine hardener.

8. An adhesive composition according to claim 7 wherein the unhindered aliphatic amine hardener is selected from the group consisting of diethylenetriamine, triethylenetetramine, tetraethylenepentamine, 2-methyl-1,5-pentanediamine, pentaethylenehexamine, ethylenediamine, tetramethylenediamine, hexamethylenediamine, bis-hexamethylenetriamine, 3,9-bis(3-aminopropyl)-2,4,8,10-tetraoxaspiro[5,5]-undecane, and 1,3-bis-aminomethylcyclohexane.

9. An adhesive composition according to claim 8 wherein the unhindered aliphatic amine hardener is selected from the group consisting of diethylenetriamine, triethylenetetramine, tetraethylenepentamine, 2-methyl- 1,5-pentanediamine, or 1,3-bis-aminomethylcyclohexane.

10. An adhesive composition according to claim 1 wherein ⊙ is selected from the group consisting of

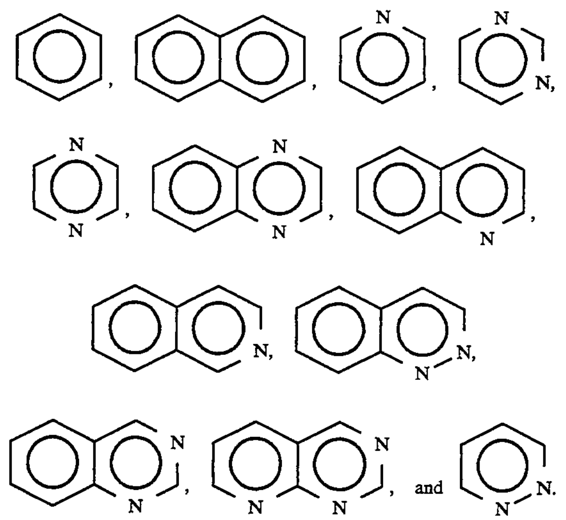

11. An adhesive composition according to claim 1 wherein X is selected from the group consisting of —Cl, $—NO_2$, $—CF_3$, $—CO_2R$, $—CH_2OR$, —CN, and $—SO_2R$, where R is an alkyl radical having from 1 to 5 carbon atoms or aryl.

12. An adhesive composition according to claim 1 wherein the hydroxy-substituted aromatic compound is selected from the group consisting of p-chlorophenol; m-chlorophenol; 3-chloro-4-fluorophenol; 3,4-dichlorophenol; 3,4-difiuorophenol; 4-hydroxy benzoic acid esters of ethanol, 1-propanol, 2-propanol, 2-methyl-2-propanol; 3-hydroxy-phenylmethylsulfone; 4-hydroxyphenyl-2-propylsulfone; 4-fluoro-1-hydroxynaphthalene; 4-chloro- 1-hydroxynaphthalene; 2-nitro- 1-hydroxy-naphthalene; 3-hydroxypyridine; 2-hydroxypyridine; 2-chloro-3-hydroxypyridine; 3-hydroxyquinoline; 4-hydroxyquinoline; 5-hydroxyquinoline; 6-hydroxyquinoline; 7-hydroxyquinoline; 8-hydroxyquinoline; 8-hydroxy-7-chloroquinoline; 2-methyl-8-hydroxyquinoline; 4-hydroxypyridazine; 5-, 2- and 4-hydroxypyrimidine; 4-hydroxy-5-methoxypyrimidine; 4-hydroxy-6-chloropyrimidine; 4-hydroxy-6-diethoxymethylpyrimidine; 2-hydroxy-5-nitropyrimidine; 2-hydroxypyrazine; 3-, 4-, 5-, 6-, 7- and 8-hydroxycinnoline; 8-hydroxy-4-methylcinnoline; 4-, 5-, 6-, 7- and 8-hydroxyquinazoline; 8-hydroxy-4-methylquinazoline; 2-hydroxyquinoxaline; 7-hydroxypteridine; 4-hydroxy-2-methylpteridine; 4-hydroxy-6-methylpteridine; and 4-hydroxy-7-methylpteridine.

13. An adhesive composition according to claim 1 wherein the hydroxy-substituted aromatic compound is a halogenated phenolic compound selected from the group consisting of p-chlorophenol, 3-chloro-4-fluorophenol, 3,4-dichlorophenol, and 3,4-difiuorophenol.

14. An adhesive composition according to claim 13 wherein the hydroxy-substituted aromatic compound is p-chlorophenol.

15. An adhesive composition according to claim 1 wherein the hydroxy-substituted aromatic compound is a hydroxy benzoic acid ester selected from the group consisting of the 4-hydroxy benzoic acid esters of ethanol and 1-propanol.

16. An adhesive composition according to claim 1 wherein the hydroxy-substituted aromatic compound is a hydroxy-substituted naphthalene compound selected from the group consisting of 4-chloro-1-hydroxynaphthalene; and 2-nitro-1-hydroxynaphthalene.

17. An adhesive composition according to claim 1 wherein the hydroxy-substituted aromatic compound is a hydroxy-substituted pyridine compound selected from the group consisting of 2-hydroxypyridine and 3-hydroxypyridine.

18. An adhesive composition according to claim 1 wherein the hydroxy-substituted aromatic compound is a hydroxy-substituted pyrimidine compound selected from the group consisting of 4-hydroxy-pyrimidine and 5-hydroxypyrimidine.

19. An adhesive composition according to claim 1 wherein the hydroxy-substituted aromatic compound is a hydroxy-substituted quinoline compound selected from the group consisting of 3-hydroxyquinoline; 5-hydroxyquinoline; 7-hydroxyquinoline; and 2-methyl-8-hydroxyquinoline.

20. An adhesive composition according to claim 1 further comprising a rubber component which is different from, and independent of, the amine hardener said rubber component being capable of providing toughness and flexibility to the adhesive composition.

21. An adhesive composition according to claim 20 wherein the rubber component is a polyacrylate, polybutadiene, or polyisoprene dispersed in an epoxy resin.

22. An adhesive composition according to claim 20 wherein the rubber component is selected from the group consisting of acrylate-terminated butadienes and amine-, acrylate-, and epoxy-terminated butadiene-acrylonitrile copolymer rubbers.

23. An adhesive composition according to claim 22 wherein the rubber component is an amine-terminated butadiene-acrylonitrile copolymer rubber.

24. An adhesive composition according to claim 1 wherein the hydroxy-substituted aromatic compound has a pKa ranging from about 6 to 9.6 and a boiling point greater than about 215° C.

25. An adhesive composition according to claim 24 wherein the hydroxy-substituted aromatic compound has a pKa ranging from about 7 to 9.5.

26. An adhesive composition according to claim 1 wherein the epoxy compound is present in an amount ranging from about 30 to 80 percent by weight, the amine hardener is present in an amount ranging from about 10 to 50 percent by weight, and the hydroxy-substituted aromatic compound is present in an amount ranging from about 2 to 20 percent by weight of the essential ingredients of the adhesive composition.

27. An adhesive composition according to claim 26 wherein the epoxy compound is present in an amount ranging from about 40 to 60 percent by weight, the amine hardener is present in an amount ranging from about 20 to 40 percent by weight, and the hydroxy-substituted aromatic compound is present in an amount ranging from about 5 to 15 percent by weight of the essential ingredients of the adhesive composition.

* * * * *